(12) United States Patent
Girgensohn et al.

(10) Patent No.: US 7,555,718 B2
(45) Date of Patent: Jun. 30, 2009

(54) SYSTEM AND METHOD FOR PRESENTING VIDEO SEARCH RESULTS

(75) Inventors: Andreas Girgensohn, Menlo Park, CA (US); John E. Adcock, Menlo Park, CA (US); Lynn D. Wilcox, Palo Alto, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 843 days.

(21) Appl. No.: 10/986,735

(22) Filed: Nov. 12, 2004

(65) Prior Publication Data
US 2006/0106764 A1 May 18, 2006

(51) Int. Cl.
*G06F 3/00* (2006.01)
(52) U.S. Cl. .................. 715/723; 715/716; 715/719; 707/3
(58) Field of Classification Search .......... 715/723, 715/724, 716, 719; 707/3
See application file for complete search history.

(56) References Cited

U.S. PATENT DOCUMENTS

| | | | |
|---|---|---|---|
| 5,821,945 A * | 10/1998 | Yeo et al. ................. 345/440 |
| 5,903,892 A * | 5/1999 | Hoffert et al. .............. 707/10 |
| 6,363,380 B1 * | 3/2002 | Dimitrova ................. 707/6 |
| 6,366,303 B1 * | 4/2002 | Venolia .................. 715/856 |
| 6,535,639 B1 | 3/2003 | Uchihashi et al. |
| 6,957,386 B2 * | 10/2005 | Nishina et al. ............ 715/716 |
| 7,263,659 B2 * | 8/2007 | Hull et al. ............... 715/716 |
| 2003/0061612 A1 * | 3/2003 | Lee et al. .................. 751/61 |
| 2003/0095720 A1 * | 5/2003 | Chiu et al. ............... 382/284 |
| 2003/0189588 A1 * | 10/2003 | Girgensohn et al. ........ 345/723 |

OTHER PUBLICATIONS

Wikipedia, "Hyperlink," Archival Date of Dec. 19, 2003.*

* cited by examiner

*Primary Examiner*—Sara M Hanne
(74) *Attorney, Agent, or Firm*—Fliesler Meyer LLP (57) ABSTRACT

The invention displays video search results in a form that makes it easy for users to determine which results are truly relevant. Each story returned as a search result is visualized as a collage of keyframes from the story's shots. The selected keyframes and their sizes depend on the corresponding shots' respective relevance. Shot relevance depends on the search retrieval score of the shot and, in some embodiments, also depends on the search retrieval score of the shot's parent story. Once areas have been determined, the keyframes are scaled and/or cropped to fit into the area. In one embodiment, users can mark one or more shots as being relevant to the search. In one embodiment, a timeline is created and displayed with one or more neighbor stories that are each part of the video and which are closest in time of creation to the selected story.

28 Claims, 5 Drawing Sheets

SYSTEM AND METHOD FOR PRESENTING VIDEO SEARCH RESULTS

COPYRIGHT NOTICE

A portion of the disclosure of this patent document contains material that is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

FIELD OF THE INVENTION

The invention is in the field of media analysis and presentation and is related to systems and methods for presenting search results, and particularly to a system and method for presenting video search results.

BACKGROUND

Video presentation affects the usefulness and accessibility of a collection of videos. A system and method for presenting video search results in a way that maximizing relevant information for the user is desirable. Searches in video collections can return a large number of relevant results. It is important to present those results in a form that enables users to quickly decide which of the results best satisfy the user's original information need. Video shots are uninterrupted sequences of visual coherence, usually shot by the same camera without turning it off. Stories are semantically related groups of shots, where the semantic information comes from a time-aligned text transcript. This transcript may come from automatic speech recognition or close captions. Story boundaries can come from annotations in the text, e.g., section markers in closed captions, or they can be determined with a variety of automatic text processing methods, including self-similarity, vocabulary innovation and others.

SUMMARY

The invention displays video search results in a way that makes it easy for users to determine which videos are most relevant to the user's needs. A collage of keyframes is assembled, with each keyframe corresponding to a shot that is part of a story located through the search. The same video shot is visualized differently depending on the search that located the video containing that shot. The size of a keyframe will vary based on the relevance to a given search of the corresponding shot.

The invention makes use of a pre-search segmentation of each video into shots and stories. Stories are used as the documents for the video search. A search returns a ranked list of stories. When searching for video sequences relevant to a search, each story is treated as an independent document, and the collection of stories determines a collection of text documents over which any kind of text searching can be performed. A search can be a text search, a visual search, or a combination of both text and visual searches. In the latter case, scores from the text search are combined with scores from the image search to form a final overall score by which the search results are sorted.

According to the invention, video search results are displayed in a form that makes it easy for users to determine which results are truly relevant. According to the invention, shots are represented by one or more representative keyframes.

Results for a search are returned in the form of stories. Each story is visualized as a collage of keyframes. The keyframes selected and their sizes depend on the relevance to the search of the corresponding shots. The relevance of stories is coded in a redundant fashion. Shot relevance depends on the search retrieval score of the shot and, in some cases, of the parent story. Keyframes may be scaled and/or cropped. The keyframes for all shots contained in a story can be seen expanded in a separate pane by selecting the keyframe-collage for a story.

BRIEF DESCRIPTION OF THE DRAWINGS

Preferred embodiment(s) of the present invention will be described in detail based on the following figures, wherein.

DETAILED DESCRIPTION

The invention displays video search results in a way that makes it easy for users to determine which videos are most relevant to the user's needs. A collage of keyframes is assembled, with each keyframe corresponding to a shot that is part of a story located through the search. The same video shot is visualized differently depending on the search that located the video containing that shot. The size of a keyframe will vary based on the relevance to a given search of the corresponding shot and, in some embodiments, also the relevance of the story as a whole.

The system makes use of a previous segmentation of each video into shots and stories. Shots are sequences in video without any major visual change. Videos typically contain one or more stories. Stories typically contain one or more shots and are created by finding topic changes in the time-aligned text. Because stories and shots are detected independently, the story boundaries and shot boundaries do not necessarily coincide. Shots may, on occasion, be longer than stories. Stories are used as the documents for the video search.

A search returns as results a ranked list of stories. When searching for video sequences relevant to a search, each story is treated as an independent document, and the collection of stories determines a collection of text documents over which any kind of text searching can be performed.

A search can be a text search, a visual search, or a combination of both text and visual searches. In the latter case, scores from the text search are combined with scores from the image search to form a final overall score by which the search results are sorted. A text search can be a literal keyword text search or a latent semantic analysis (LSA)-based text search. Standard techniques are used such as term frequency, inverse-document-frequency (tf-idf), weighted keyword searches, or Latent Semantic Analysis (LSA) based similarity searches. For keyword-based searching, independent text indices are built. One text index is built for the story-based documents and another text index is built for the shot-based documents. In the case of LSA-based searches, the latent semantic space is built based upon the documents derived from the story segmentation since the stories are presumed to represent semantically coherent units. This one semantic space is used to determine both story relevance and shot relevance to a search.

For visual searches, an image similarity matching capability is provided based on color correlograms. Any shot image visible in the graphical user interface can be dragged into the search bar and used as part of a visual search. For each image, a color correlogram is computed and compared to the correlogram for every shot image contained in the corpus of target images. To generate a relevance score for a story, the maximum score from the component shots is propagated to the story.

Figure 1:
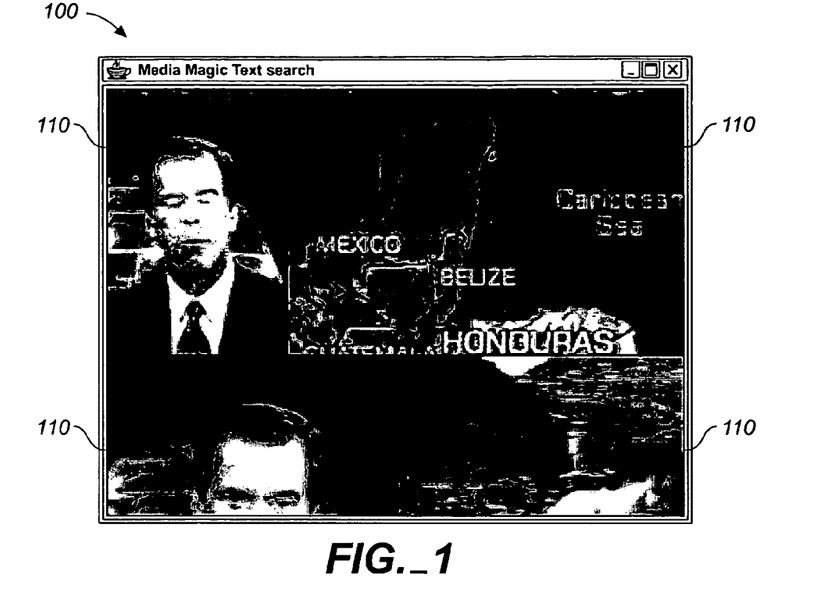
FIG. 1 is a partial screenshot illustrating a representative collage of four keyframes.

Each story is visualized as a collage of keyframes from the shots contained in the story. FIG. 1 is a partial screenshot illustrating a representative collage 100 of four keyframes 110. The keyframes 110 selected and their sizes depend on the relevance to the user-issued search of the underlying shots. The most relevant shots are selected, and their keyframes 110 are combined to form a collage 100.

One embodiment entails creation of collages containing more than four keyframes. Another embodiment entails creation of collages containing fewer than four keyframes. Another embodiment involves collages containing keyframes created in a rectangular layout. According to another embodiment, collages are created containing keyframes created in a non-rectangular layout. According to one embodiment, the relevance of shots is indicated by the brightness of the corresponding keyframe. According to one embodiment, video shot relevance is indicated by the contrast of the corresponding keyframe. According to one embodiment, the relevance of shots is indicated by the opacity of the corresponding keyframe. According to one embodiment, video shot relevance is indicated by one of the color saturation and the pattern of the corresponding keyframe.

In one set of embodiments, a selected collage is displayed in larger format than the other collages. In some embodiments, shot relevance depends on only the search retrieval score of the shot. In other embodiments, shot relevance is determined based on the search retrieval scores of both the shot itself and its parent story. In one set of embodiments, each shot has a search retrieval score equal to the average of the search retrieval score for the shot itself and the search retrieval score for the parent story. These embodiments thus allow for propagation of search relevance between shots and stories.

According to one embodiment, keyframes are scaled. According to another embodiment, keyframes are cropped. According to another embodiment, keyframes are scaled and cropped. Cropping may preserve details in the keyframes. The keyframes for all shots contained in a story can be seen expanded in a separate pane by selecting the keyframe collage for a story.

For searches based on image features, shots are treated as units because the visual appearance does not change much during a shot. The text corresponding to shots can also be treated as documents so that shorter video sequences of interest can be found with text searching methods. Because the retrieval accuracy for very short text documents (most shots are short and have little associated text) is lower, relevance scores for shots and the stories they contain can be combined and used instead of using the scores for shots directly. For visual searches, visual search retrieval scores are only determined for a given shot because visual appearance typically varies widely between shots. Visual search retrieval scores for shots inside a story can be combined to form a search retrieval score for the story. A story can be assigned the maximum visual search retrieval score achieved by the shots it contains. Alternatively, a story can be assigned the average visual search retrieval score of the shots it contains. In one embodiment, averages are computed directly with no weighting. In one embodiment, averages are time-weighted averages.

Search results are visualized by keyframes and collages of keyframes. The keyframes are pulled from the retrieved video sequences. In one embodiment, relevance is indicated by keyframe size. In one embodiment, the larger the keyframe, the higher the relevance of the keyframe. In one embodiment, the area of the keyframe is proportional to its relevance. In one embodiment, a keyframe's relevance is indicated by one of a color and a pattern associated with the keyframe. In one embodiment, a color appears as color bars shown on top of the keyframes. In one embodiment, a pattern appears as pattern bars shown on top of the keyframes.

To create a collage, the keyframes for the shots with the highest relevance to the search are selected. Each keyframe is assigned an area proportional to the relative relevance of its shot. For example, if the relevance for four shots is 0.8, 0.4, 0.6, and 0.2, respectively, the first shot is assigned an area of:

$$0.8/(0.8+0.4+0.6+0.2)=40\%$$

In one embodiment, the four most relevant shots are divided into two groups, one of which contains the most relevant two shots, the other of which contains the least relevant two shots. Then a horizontal line is created to Once areas have been determined, the keyframes are scaled and/or cropped to fit into the areas. According to one embodiment, the horizontal center and the vertical top of the original keyframe are maintained to avoid cutting off the top of a head in case the keyframe depicts a close-up view of a person (e.g., a news anchor) or another similarly cropping-sensitive view. Other methods can be used as well. A more general approach can specify the cropping percentage in each direction. For the just described embodiment, 50% of the horizontal cropping is done at the left and 0% of the vertical cropping at the top. Another embodiment crops 33% of the vertical cropping at the top to favor the top part without including the image margin. According to another embodiment, regions of interest such as faces are detected and used as a basis for cropping. In one embodiment, for example, if extreme cropping is undesirable, keyframes can be scaled and then cropped to adjust the aspect ratio to the assigned area.

In one embodiment, users can mark one or more shots as being relevant to the search. In one embodiment, shots marked as relevant are displayed. In one embodiment, users can mark one or more shots for inclusion in the search results. This embodiment can help the user in determining which shots have already been determined to be relevant.

In one embodiment, users can mark one or more shots as being irrelevant to the search. In one embodiment, shots that are marked as irrelevant are presented with one of a color overlay and a pattern overlay. This embodiment can help the user in determining which shots have already been determined to be irrelevant. According to one set of embodiments, a panel is created that displays candidate keyframes from each story. In one embodiment, the user selects keyframes to be included in the collage by marking them. In one embodiment, included keyframes are indicated by an overlay employing one of an inclusion-indicating color and an inclusion-indicating pattern. In another embodiment, the user selects keyframes to be excluded from the collage by marking them. In one embodiment, excluded keyframes are indicated by an overlay employing one of an exclusion-indicating color and an exclusion-indicating pattern. In one embodiment, the user selects keyframes to be included or excluded in the collage by marking them appropriately. In one embodiment, included keyframes are indicated by an overlay employing one of an inclusion-indicating color and an inclusion-indicating pattern; and excluded keyframes are indicated by an overlay employing one of an exclusion-indicating color and an exclusion-indicating pattern. The inclusion-indicating and exclusion-indicating colors may be translucent to reveal the keyframe underneath even if a solid pattern is used.

Figure 2:
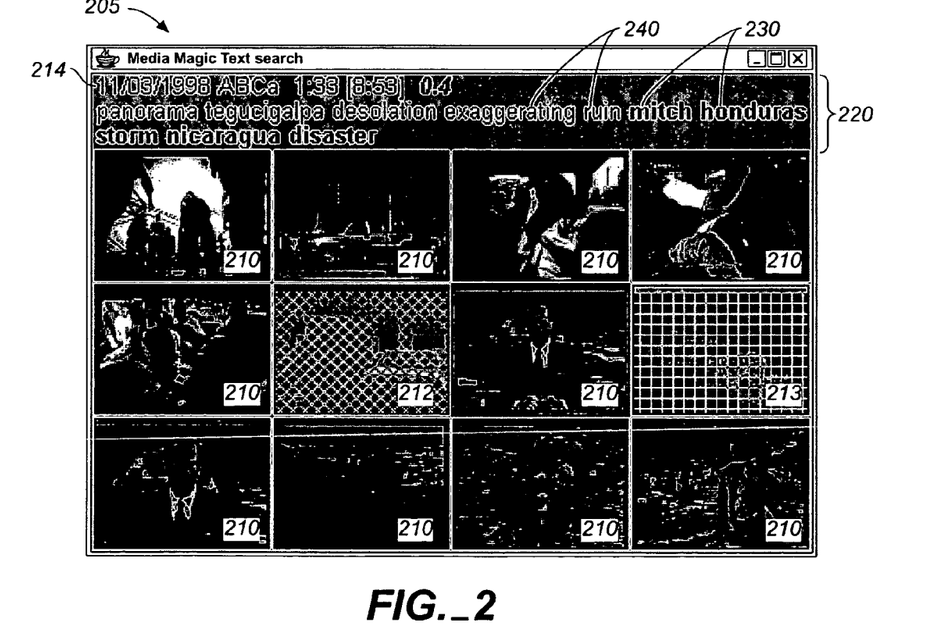
FIG. 2 is a partial screenshot illustrating a keyframe selection panel containing keyframes from a selected story that are intended to be marked for inclusion and/or exclusion in a collage.

FIG. 2 is a partial screenshot illustrating a keyframe selection panel 205 containing keyframes 210 from a selected story that are intended to be marked for inclusion and/or exclusion in a collage. The user selects keyframes 210 to be included and/or excluded in the collage by marking them as an exclusion-selected keyframe 212 or as an inclusion-selected keyframe 213. The exclusion-selected keyframe 212 is indicated by an overlay employing one of an exclusion-indicating color and an exclusion-indicating pattern. The inclusion-selected keyframe 213 is indicated by an overlay employing one of an inclusion-indicating color and an exclusion-indicating pattern. In one set of embodiments, the panel 205 displays keywords 230. In one set of embodiments, the panel 205 displays document terms 240.

The panel 205 also contains a tool tip 220. The tool tip 220 provides additional information regarding a story. In one embodiment, this additional information includes taxonomic data 214 such as location, date, broadcasting network, story length, shot length, story start time within the video, and finally, in boldface, relevance of the story to the search, on a scale of zero to one. In one embodiment, the additional information includes one or more keywords 230 that best distinguish the story from other stories. In one embodiment, the additional information includes one or more keywords 230 that are most relevant to the search. In one embodiment shown in this figure, the keywords 230 are displayed in boldface. The tool tip 220 also displays document terms 240 in regular typeface. With a standard tf-idf retrieval approach, the keywords 230 are the search terms appearing in the story. With LSA retrieval, the keywords 230 need not coincide with the search terms but may, for example, be synonyms or thematically related words.

Stories can contain many shots that may have a very different visual appearance from each other. In some cases, showing keyframes from all shots might take up too much space when listing several stories. According to one embodiment, the keyframes for the shots of a story are shown in a separate pane after the user selects the story. As one example depicted in FIGS. 5 and 6, the keyframes are shown in the lower right hand pane.

According to one embodiment, a selected video is displayed in the video player frame. According to one embodiment, a selected collage is displayed in the video player frame.

According to one set of embodiments, tool tips reveal additional information about retrieved stories. In one embodiment, this information includes the keywords that best distinguish a story from other stories, and the keywords most closely related to the search, and/or taxonomic data such as location, date, broadcasting network, story length, shot length, story start time within the video, and relevance of the story to the search. A tool tip is displayed comprising information about one or more selected stories.

Certain embodiments include an "Add related" button. Every time the "Add related" button is pressed, it adds a pre-selected number of additional shots to the result pane for each search. The shots added are the ones ranking highest in relevance that are not already in the result pane and that were not previously marked by the user as irrelevant. As one example involving a single search illustrated as described below in FIG. 6, several shots are added each time on the extreme right side of the user interface. In the case of more than one search, for every shot in the video collection, a weighted average is computed from the search retrieval scores for all issued searches for that shot. For each search, the N shots are found with the highest relevance score. As one example, N=500. The highest ranked shot is awarded 500, the next-ranking shot is given 499 points, etc. For each query, the points for the shots that are already among the results are added together. The normalized point total for each query is used as a weight for a weighted average. For each shot in the video collection, the weighted average of the query scores is computed. The shots with the highest average that are not already among the results are added to them. In the absence of any shots in the results, all queries are given an equal weight.

According to this example, the ten shots with the highest scores are then added to the result pane. If the user has removed a shot by marking it as irrelevant, it is not eligible to be added by the "Add related" button.

Figure 3:
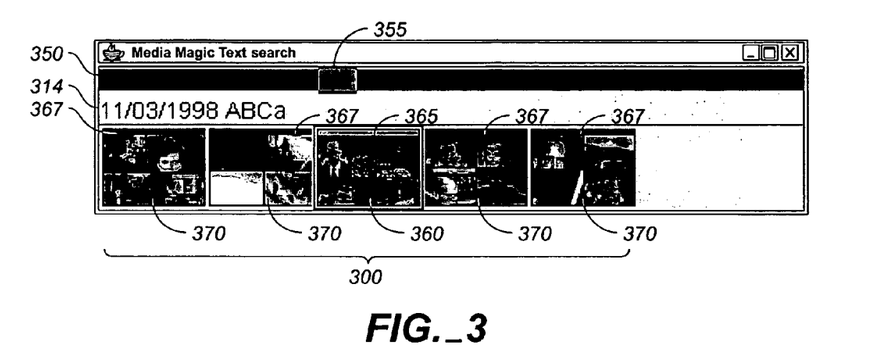
FIG. 3 is a partial screenshot illustrating the display according to one set of embodiments of a timeline for a video depicted with several collages corresponding to stories which are part of the video.

FIG. 3 is a partial screenshot illustrating the display according to one set of embodiments of a timeline 350 for a video depicted with several collages 300 corresponding to stories which are part of the video. These collages 300 include neighbor collages 370 and one selected story 360. The crossbar 355 of the timeline 350 indicates the point on the timeline 350 corresponding with the currently selected story 360. The coding of each collage represents each keyframe's relevance. As one example, one of color bars and pattern bars are used to indicate relevance. In this example, the selected keyframe has a different level of relevance from the other keyframes, as indicated by its different pattern bar 365, which differs from the pattern bars 367 of the other stories. As one example, a color bar that is dark blue over green may represent the least relevant keyframes, and a bright yellow color bar may represent the most relevant keyframes. The selected story is indicated in the timeline. According to one embodiment, keyframes can be selected by a user to provide further information on the corresponding story. As one example, a selection can be made by clicking anywhere in the timeline.

According to one set of embodiments, a timeline is displayed with one or more neighbor stories which are each in the video and which are closest in time of creation to a selected story. According to one set of embodiments, for each of the neighbor stories, a set of neighbor keyframes is selected, and a neighbor collage is created and displayed.

Figure 4:
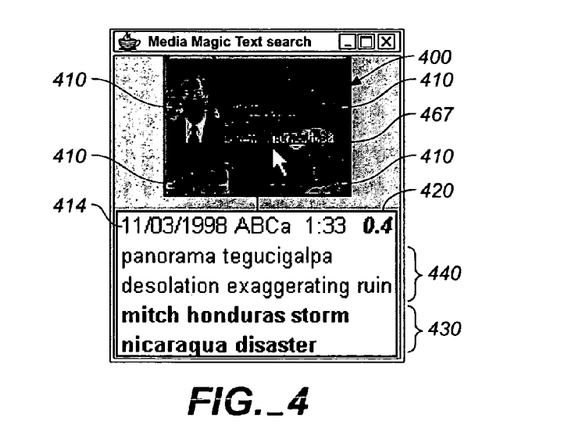
FIG. 4 is a partial screenshot depicting an embodiment according to which a tool tip is displayed providing additional information regarding a story.

FIG. 4 is a partial screenshot depicting an embodiment according to which a tool tip 420 is displayed providing additional information regarding a story. A collage 400 is also displayed composed of four keyframes 410. The pattern bar 467 of the collage 400 indicates its relevance. In the embodiment depicted, the additional information contained in the tool tip 420 includes search keywords 430 in boldface and document terms 440 in regular typeface. In one embodiment, this additional information includes one or more document terms 440 that best distinguish the story from other stories. In one embodiment, the additional information includes one or more keywords 430 most relevant to the video search. In the depicted embodiment, this additional information also includes taxonomic data 414 such as location, date, broadcasting network, story length, shot length, story start time within the video, and relevance of the story to the search. FIG. 4 integrates material from all three previous figures, combining the pattern bar 367 depicted in FIG. 3, the tool tip 220 depicted in FIG. 2, and the collage 100 depicted in FIG. 1.

Figure 5:
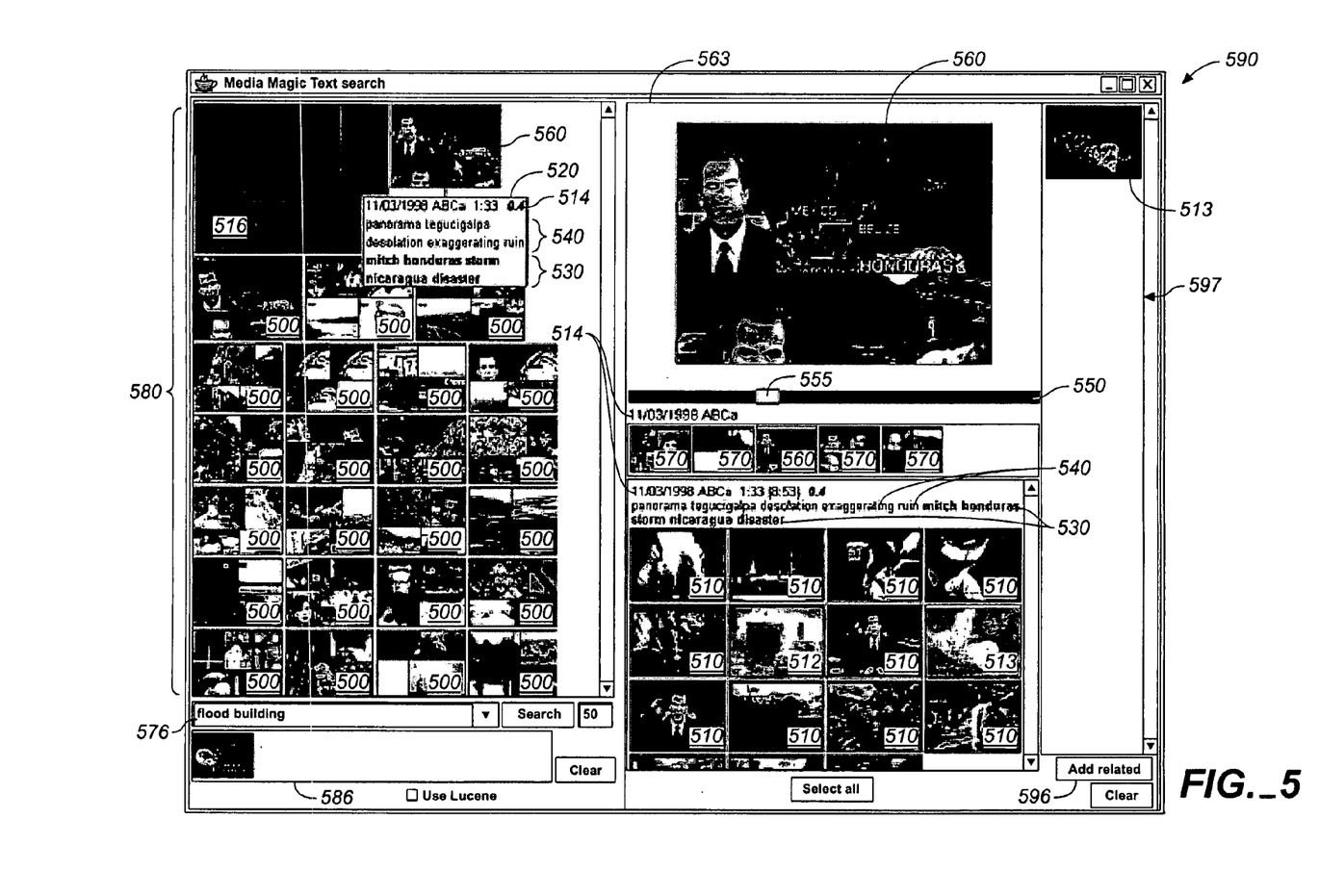
FIG. 5 is a full screenshot of an embodiment reproducing the inclusion-selected keyframes in the right-hand panel, in which the selected collage appears in the media player space.
Figure 6:
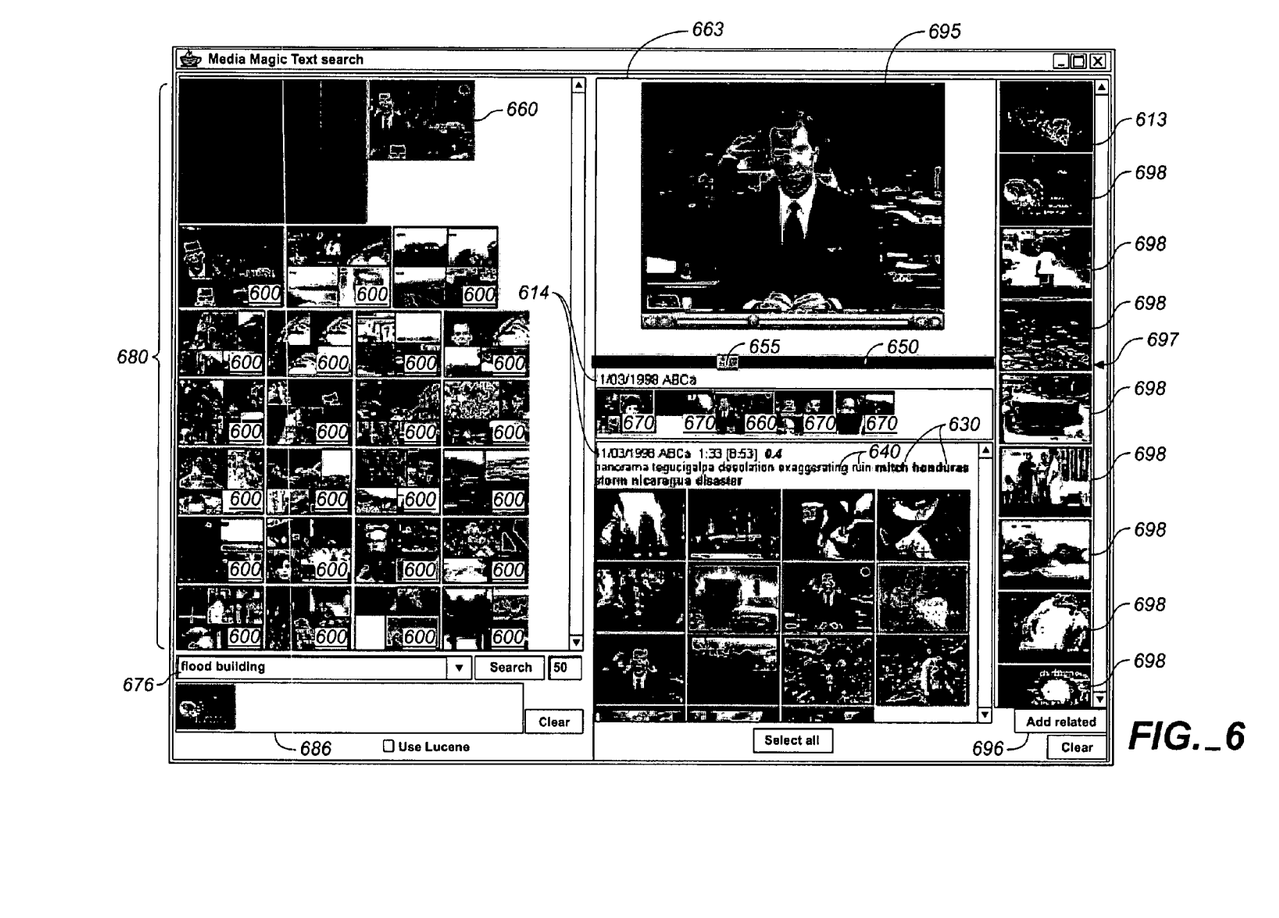
FIG. 6 is a full screenshot of an embodiment reproducing in the right-hand panel both the inclusion-selected keyframes as well as the images 698 added by the "add-related" button, and in which the video corresponding to the selected collage plays in the media player space.

FIGS. 5 and 6 are full screenshots of two embodiments of the invention. Both figures combine elements present in all four previous figures.

In the embodiment depicted in FIG. 5, the screen 590 contains a panel 597 on the far right that reproduces the inclusion-selected keyframes 513, and a selected collage 560 appears in the video player space 563. The screen 590 includes a story display region 580 on the left-hand side that shows stories displayed in relevance order in the form of collages 500. The collage 500 that corresponds to the story that was most relevant to the search is displayed in a larger size as most-relevant collage 516. In the figure, it is displayed with a translucent overlay to indicate that the collage has already been visited by the user.

Next to most-relevant collage 516 in the upper right corner of story display region 580 appears a currently selected collage 560. Currently selected collage 560 appears in two other places on screen 590: in miniature with its neighbor videos 570 below the timeline 560 on the center right, and in large form in the video player space 563 at the upper right. This is the same collage depicted in a close-up view in FIG. 1. At the upper right corner of story display region 580, a tool tip 520 is located directly below currently selected collage 560. The tool tip 520 contains taxonomic information 514. Below that are the search terms 540 in regular typeface and the keywords 530 in boldface.

On the right-hand side of screen 590, currently selected collage 560 appears in large format in the video player space 563. Below is the timeline 550 with crossbar 555, and below that appears taxonomic information 514. Next can be seen the four neighbor collages 570 with the currently selected collage 560 between them, as pictured in close-up view in FIG. 3. Directly below is another set of taxonomic information 514. Below that are the search terms 540 in regular typeface and the keywords 530 in boldface. At the bottom on the right side is the keyframe selection panel 505 as seen in FIG. 2. The panel 505 contains keyframes 510 from the selected story that are intended to be marked by the user for inclusion and/or exclusion in a collage, including an exclusion-selected keyframe 512 and an inclusion-selected keyframe 513. Color overlays, discernible here as differentiated opacity levels, indicate the user-designated status of exclusion-selected keyframe 512 and an inclusion-selected keyframe 513. Also visible on the bottom left is the search text button 576 and the visual search entry 586. On the bottom right can be seen the "add related" button 596. The right-hand panel 597 reproduces the inclusion-selected keyframe 513.

In the embodiment depicted in FIG. 6, the screen 690 contains a panel 697 on the far right that displays both the inclusion-selected keyframe 613 and the images 698 added by the "add-related" button 696, and the video 695 corresponding to the selected collage 660 plays in the video player space 663. The screen 690 includes a story display region 680 on the left-hand side that shows stories displayed in relevance order in the form of collages 600. The collage 600 that corresponds to the story that was most relevant to the search is displayed in a larger size as most-relevant collage 616. In the figure, it is displayed with a translucent overlay to indicate that the collage has already been visited by the user.

Next to most-relevant collage 616 in the upper right corner of story display region 680 appears a currently selected collage 660. Currently selected collage 660 appears again in miniature with its neighbor videos 670 below the timeline 660 on the center right. This is the same collage depicted in a close-up view in FIG. 1. At the upper right corner of story display region 680, a tool tip 620 is located directly below currently selected collage 660. The tool tip 620 contains taxonomic information 614. Below that are the search terms 640 in regular typeface and the keywords 630 in boldface.

On the right-hand side of screen 690, the video 695 corresponding to the selected collage 660 plays in the video player space 663. Below is the timeline 650 with crossbar 655, and below that appears taxonomic information 614. Next can be seen the four neighbor collages 670 with the currently selected collage 660 between them, as pictured in close-up view in FIG. 3. Directly below is another set of taxonomic information 614. Below that are the search terms 640 in regular typeface and the keywords 630 in boldface. At the bottom on the right side is the keyframe selection panel 605 as seen in FIG. 2. The panel 605 contains keyframes 610 from the selected story that are intended to be marked by the user for inclusion and/or exclusion in a collage, including an exclusion-selected keyframe 612 and an inclusion-selected keyframe 613. Color overlays, discernible here as differentiated opacity levels, indicate the user-designated status of exclusion-selected keyframe 612 and an inclusion-selected keyframe 613. Also visible on the bottom left is the search text button 676 and the visual search entry 686. On the bottom right can be seen the "add related" button 696. The right-hand panel 697 reproduces the inclusion-selected keyframe 613 and the "add-related" images 698 added by the "add-related" button 696.

It can be seen from FIGS. 5 and 6 that the relevance of stories is coded in a redundant fashion. As one example, the left side of the user interface in FIGS. 5 to 6 lists stories in relevance order and presents more relevant stories with larger images. As one example, on the right side, stories have one of a color bar and a pattern bar that indicates relevance. The same stories may be depicted differently for different searches and/or in different parts of the interface. Selecting one of those representations selects all other representations of the same story as well.

Figure 7:
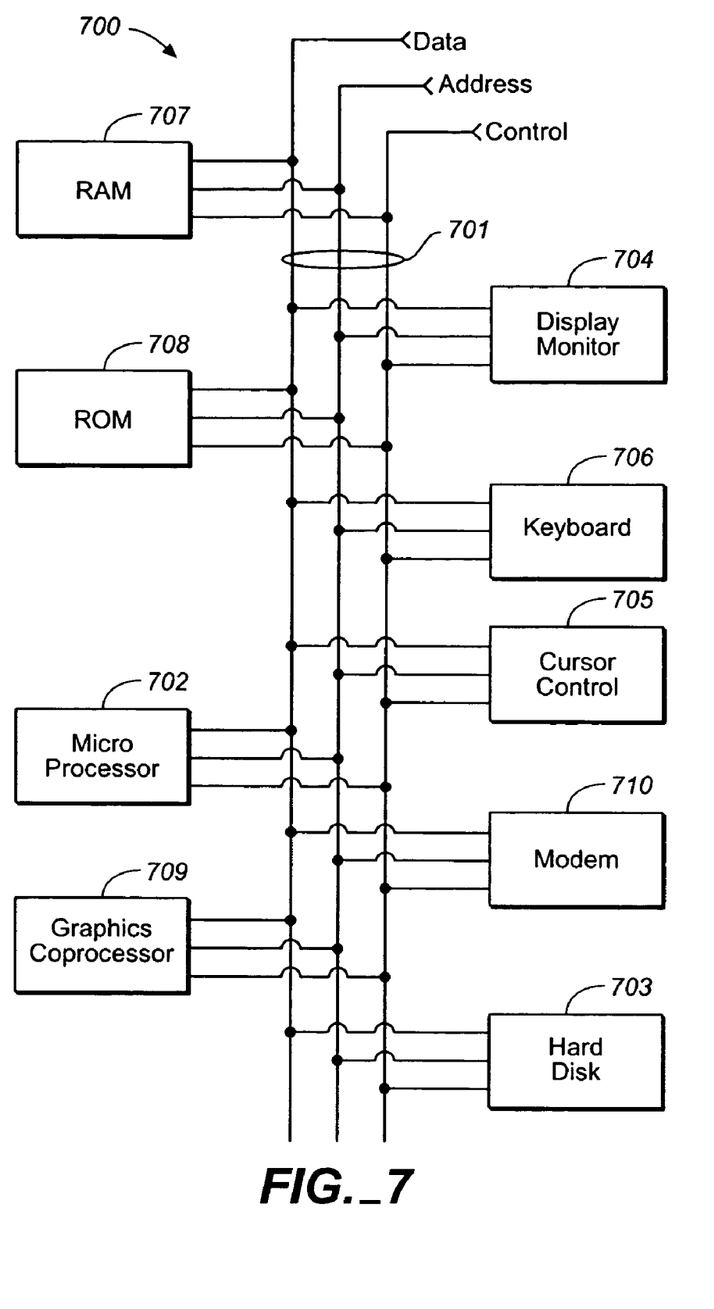
FIG. 7 is a block diagram that illustrates a general purpose computer system suitable for implementing the methods according to the present invention.

System Implementation:

FIG. 7 is a block diagram that illustrates a general purpose computer system 700 suitable for implementing the methods according to the present invention. The general purpose computer system 700 includes one or more processors 702. The cursor control device 705 is implemented as a mouse, a joy stick, a series of buttons, or any other input device which allows a user to control position of a cursor or pointer on the display monitor 704. The general purpose computer may also include random access memory 707, external storage 703, ROM memory 708, a keyboard 706, a modem 710 and a graphics co-processor 709. The cursor control device 705 and/or the keyboard 706 are exemplary user interfaces for receiving user input according to the present invention.

All of the elements of the general purpose computer 700 are optionally tied together by a common bus 701 for transporting data between the various elements. The bus 701 typically includes data, address, and control signals. Although the general purpose computer 700 illustrated in FIG. 7 includes a single data bus 701 which ties together all of the elements of the general purpose computer 700, there is no requirement that there be a single communication bus 701 which connects the various elements of the general purpose computer 700. For example, the one or more processors 702, RAM 707, ROM 708, and graphics co-processor 709 are alternatively tied together with a data bus while the hard disk 703, modem 710, keyboard 706, display monitor 704, and cursor control device 705 are connected together with a second data bus (not shown). In this case, the first data bus 701 and the second data bus (not shown) are linked by a bi-directional bus interface (not shown). Alternatively, some of the elements, such as the one or more processors 702 and graphics co-processor 709, are connected to both the first data bus 701 and the second data bus (not shown). Communication between the first and second data bus occurs through the one or more processors 702 and graphics co-processor 709. The methods of the present invention are thus executable on any general purpose computer system such as the 700 illustrated in FIG. 7, but there is clearly no limitation that this computer system is the only one which can execute the methods of the present invention.

In a typical implementation, the operator uses a computer system that includes a computer display, and some form of graphical interface executing thereon, for example, a Unix Windows environment, a Mac OS, or a Microsoft Windows environment, or some other graphical application environment. It will be evident to one skilled in the art that embodiments of the invention can be equally used with other forms of graphical user interface (GUI).

Appropriate software coding can readily be prepared by skilled programmers based on the teachings of the present disclosure, as will be apparent to those skilled in the software art. Embodiments of the invention may also be implemented by the preparation of application-specific integrated circuits or by interconnecting an appropriate network of conventional component circuits, as will be readily apparent to those skilled in the art.

Embodiments of the present invention include a computer program product which is a storage medium (media) having instructions stored thereon/in which can be used to program a computer to perform any of the processes of the present invention. The storage medium can include, but is not limited to, any type of disk, including floppy disks, optical disks, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Embodiments of the present invention include software, stored on any one of the computer-readable medium (media), for controlling both the hardware of the general purpose/specialized computer or microprocessor, and for enabling the computer or microprocessor to interact with a human operator or other mechanism utilizing the results of the present invention. Such software may include, but is not limited to, device drivers, operating systems, and user applications. Ultimately, such computer-readable media further includes software for executing the present invention, as described above.

Stored on any one of the computer readable medium (media), embodiments of the present invention include software for controlling both the hardware of the general purpose/specialized computer or processor, and for enabling the computer or processor to interact with a human user or other mechanism utilizing the results of embodiments of the present invention. Such software may include, but is not limited to, device drivers, operating systems, and user applications. Ultimately, such computer readable media further includes software for performing embodiments of the present invention, as described above.

Included in the software of the general/specialized computer or processor are software modules for implementing the teachings of the present invention, including, but not limited to, detecting useful images, ranking images in order of usefulness based on how closely each one resembles a "vignette," and communication of results according to the processes of embodiments of the present invention.

Embodiments of the present invention may be conveniently implemented using a conventional general purpose or a specialized digital computer or processor programmed according to the teachings of the present disclosure, as will be apparent to those skilled in the computer art.

In one embodiment, the invention is applied to a media organizer. A media organizer provides a method to organize digital photos, often through a lightbox-like interface offering the capable to view images, to rearrange them in any desired configuration, to print any or all images as desired, to delete duplicates and unwanted images, and to upload or download any or all images as desired. Media organizers may contain video images obtained as a result of a text search. Embodiments of the invention offer the capability to identify search-relevant keywords in documents with latent semantic analysis, where a search may encompass more than one search term, which complements the media organizer's other capabilities.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that the above-described features of detecting and ranking images with numerical ranks in order of usefulness based on vignette score can be incorporated into other types of software applications beyond those described. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method for presenting video search results, including one or more videos, comprising the following steps:
   a) receiving a set of video search results for the one or more videos, wherein the video search results comprise one or more stories for each of the one or more videos;
   b) selecting from each story a set of shots;
   c) selecting from each shot one or more representative keyframes, wherein an area of each keyframe in the collage indicates a relevance of the video search results to the shot selection, wherein the relevance is determined by a combination of a search retrieval score of the shot and a search retrieval score of the story comprising the shot; and
   d) creating for each story a collage comprising the keyframes, wherein the collage can be used to present the video search results.

2. The method of claim 1, further comprising the following steps:
   a) creating a panel displaying candidate keyframes from each story; and
   b) allowing a user to select keyframes to be included in the collage by marking them.

3. The method of claim 2, wherein the selected keyframes are indicated by an overlay employing one of an inclusion-indicating color and an inclusion-indicating pattern.

4. The method of claim 3, wherein one of the inclusion-indicating color and the inclusion-indicating pattern of a keyframe indicates relevance of the shot corresponding to the keyframe.

5. The method of claim 3, wherein one of the inclusion-indicating color of a keyframe and the inclusion-indicating pattern of a keyframe indicates that the shot corresponding to the keyframe was previously visited.

6. The method of claim 2, wherein the selected keyframes are displayed.

7. The method of claim 2, wherein the selected keyframes are indicated by an inclusion-indicating color overlay.

8. The method of claim 1, further comprising the following steps:
   a) creating a panel displaying candidate keyframes from each story; and
   b) allowing a user to select keyframes to be excluded from the collage by marking them.

9. The method of claim 8, wherein the excluded keyframes are indicated by an overlay employing one of an exclusion-indicating color and an exclusion-indicating pattern.

10. The method of claim 1, wherein the keyframes can be selected by a user to provide further information.

11. The method of claim 1, wherein the relevance is computed as the average of the search retrieval score of the shot and the search retrieval score of the story comprising the shot.

12. The method of claim 1, wherein the area of each keyframe in the collage is proportional to the relevance to the video search of the corresponding shot.

13. The method of claim 1, wherein the keyframes are cropped.

14. The method of claim 13, wherein the keyframes are cropped according to an aspect ratio.

15. The method of claim 13, wherein regions of interest are used as a basis for the cropping.

16. The method of claim 1, wherein the keyframes are scaled.

17. The method of claim 1, wherein the keyframes are scaled and cropped.

18. The method of claim 1, wherein the number of keyframes comprised in the set of shots keyframes is approximately four.

19. The method of claim 1, comprising the additional step of:
   d) creating a timeline displayed with one or more neighbor stories which are each comprised in the video and which are closest in time of creation to a selected story.

20. The method of claim 19, comprising the additional steps of:
   e) for each of the one or more neighbor stories, selecting a set of corresponding neighbor keyframes; and f) for each neighbor story, creating a neighbor collage comprising the neighbor keyframes.

21. The method of claim 20, wherein the collage corresponding to a selected story is displayed in a larger format than the neighbor collages.

22. The method of claim 1, in which a tool tip is displayed comprising information about one or more selected stories.

23. The method of claim 22, wherein the tool tip displays one or more keywords that best distinguish a selected story from the other stories.

24. The method of claim 23, wherein the keywords are emphasized.

25. In a computer, a method for presenting video search results comprising one or more stories, comprising the following steps:
   a) initiating, by a user of the computer, a video search capable of generating a set of video search results comprising one or more stories;
   b) receiving, by the user, a set of shots selected by the computer from each story;
   c) receiving, by the user, one or more representative keyframes selected by the computer from each shot, wherein an area of each keyframe in the story indicates a relevance of the video search results to the shot selection, wherein the relevance is determined by a combination of a search retrieval score of the shot and a search retrieval score of the story comprising the shot;
   d) receiving, by the user, for each story, a collage created by the computer comprising the keyframes; and
   e) selecting, by the user, one or more of the stories for display of the corresponding collages.

26. A system for detecting useful images and for ranking images in order of usefulness, comprising:
   a) one or more processors capable of, given a set of video search results comprising one or more stories, selecting from each story a set of shots; capable of selecting from each shot one or more representative keyframes, wherein an area of each keyframe in the story indicates a relevance of the video search results to the shot selection, wherein the relevance is determined by a combination of a search retrieval score of the shot and a search retrieval score of the story comprising the shot; and capable of creating for each story a collage comprising the keyframes; and
   b) a machine-readable storage medium, including operations stored thereon that, when processed by one or more processors, cause the system to perform the steps of:
      1) given a set of video search results comprising one or more stories, selecting from each story a set of shots;
      2) selecting from each shot one or more representative keyframes, and
      3) creating for each story a collage comprising the keyframes.

27. A machine-readable storage medium, including operations stored thereon that, when processed by one or more processors, causes a system to perform the steps of:
   a) given a set of video search results comprising one or more stories, selecting from each story a set of shots;
   b) selecting from each shot one or more representative keyframes, wherein an area of each keyframe in the story indicates a relevance of the video search results to the shot selection, wherein the relevance is determined by a combination of a search retrieval score of the shot and a search retrieval score of the story comprising the shot; and
   c) creating for each story a collage comprising the keyframes.

28. An apparatus for detecting useful images and for ranking images in order of usefulness, comprising:
   a) given a set of video search results comprising one or more stories, means for selecting from each story a set of shots;
   b) means for selecting from each shot one or more representative keyframes, wherein an area of each keyframe in the story indicates relevance to the video search of the shot corresponding to the keyframe, wherein the relevance is determined by a combination of a search retrieval score of the shot and a search retrieval score of the story comprising the shot; and
   c) means for creating for each story a collage comprising the keyframes.

* * * * *